June 5, 1956  A. H. JOHNSON  2,749,098
MIXER
Filed July 21, 1955
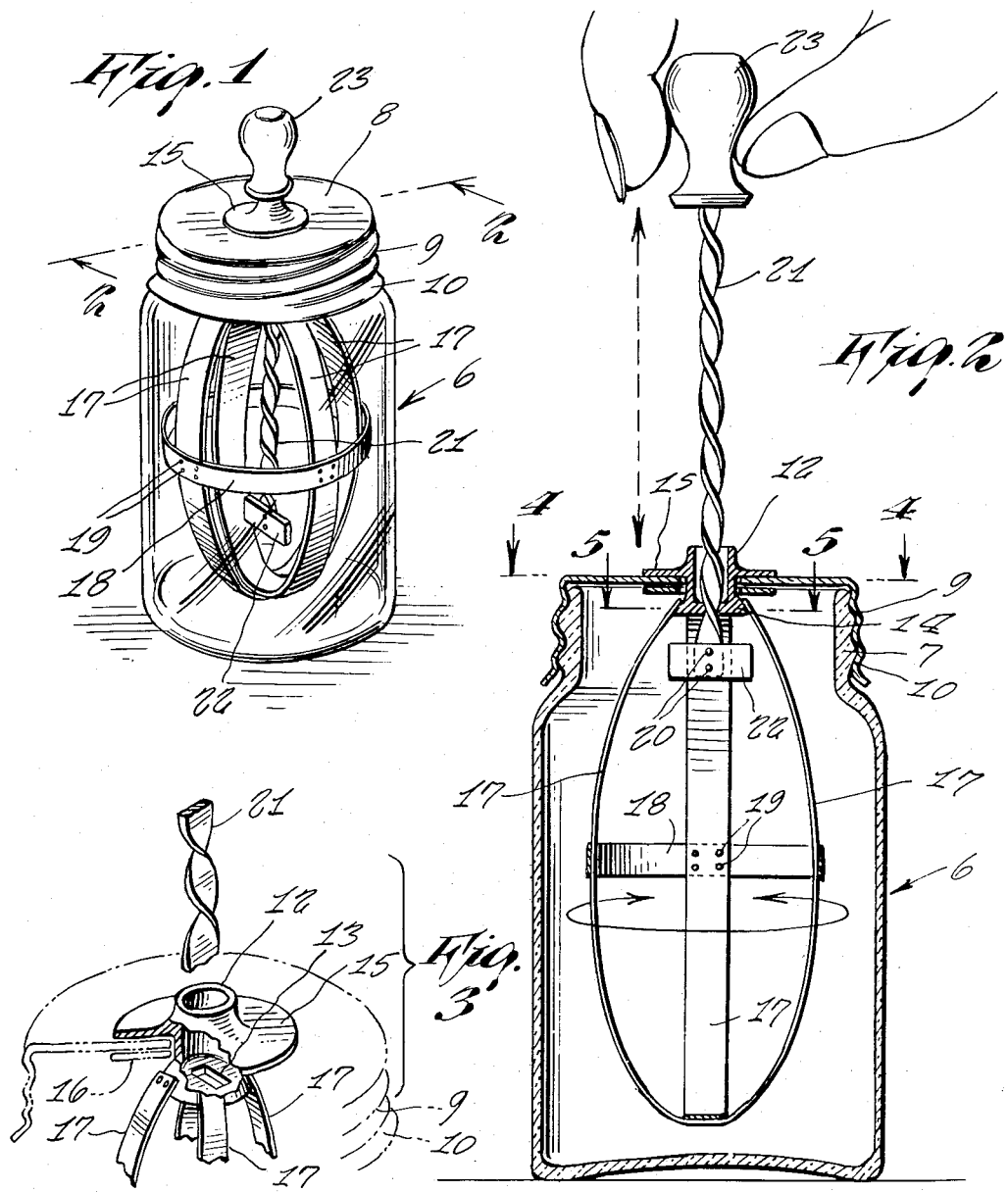
INVENTOR.
Albert H. Johnson

United States Patent Office 2,749,098
Patented June 5, 1956

2,749,098

MIXER

Albert H. Johnson, Glens Falls, N. Y.

Application July 21, 1955, Serial No. 523,485

4 Claims. (Cl. 259—117)

The present invention relates to domestic appliances used for stirring, mixing and beating various mixtures of alimentary products, and particularly to a special mixer.

The main object of my invention is to provide a manually operated domestic mixer that is operated with a minimum of effort, yet with great effect, so as to mix and stir foods thereby as desired.

Another object of this invention is to have a manually operated mixer combined with a container for the foods to be mixed.

A further object of the invention is to have the mechanism of the mixer proper mounted upon a container for the material to be mixed, and in fact, preferably screwed upon this container to form a firm mounting therefor.

Yet another object is to have a mixer mechanism including a mixing element that simply rotates in situ while a manually operated handle is pulled upwardly and pushed downwardly to provide the mixing motion of the mixing element.

It is also a definite object to have such a mixer which is simple to make at low cost and capable of being sold at a reasonable price to encourage wide distribution on the market.

A practical object is, of course, to have a mixer of the character indicated which is simple in construction and simple to use, and also not likely to get out of order.

Other objects and advantages of my invention will appear in greater detail as the specification proceeds.

In order to facilitate ready comprehension of this invention for a proper appreciation of the salient features thereof, the invention is illustrated on the accompanying drawing forming part hereof, and in which:

Figure 1 is a perspective view of my novel mixer as embodied in a practical form;

Figure 2 is an enlarged vertical section of the same mixer as taken on line 2—2 in Figure 1;

Figure 3 is a fragmentary perspective view of a portion of the mechanism of the mixer proper serving to reveal details of construction;

Figure 4 is a partial top plan view of the mixer of Figure 2, partly in section along line 4—4 in said Figure 2; and Figure 5 is a partial horizontal section of the mixer as taken on line 5—5 in Figure 2.

Throughout the views, the same reference numerals indicate the same or like parts and features.

In the kitchen, it is frequently necessary to mix, beat or stir various food fluids and mixtures of whatever kind, such mixing must either be done by hand, by a hand held egg beater if it can at all be used, or a motor driven expensive beater is employed for this purpose. Between the expensive motor driven machine and an ordinary egg beater or hand beater, there should be available a convenient manually operated mixer that is capable of performing better than the egg beater and far better than a mere hand beater or mixer.

After duly considering this problem, I have succeeded in producing a manually operated mixer along the lines already outlined, as will now be described in detail in the following.

Hence, in the practice of my invention, and referring also again to the drawing, a container, that may be a glass jar generally indicated at 6 has a wide screw neck 7 upon which may be removably screwed a special cap member 8 having the flange 9 thereof formed with screw convolutions 10 fitting the screw neck 7 of the jar. This cap has a central opening 11 (Figure 4) through which a rotatable sleeve 12 extends downwardly and at its bottom is substantially closed except for a slit 13 and externally a flaring portion 14. This member 12 has a disk-shaped flange 15 riding upon the cap or cover 8, while beneath the cover is located a washer 16 about sleeve 12 above the flaring portion 14 thereof. This construction allows the sleeve with its flange 15 and washer 16 to rotate with respect to the cover 8 and yet maintain its level or position on the cover.

Upon the lower flaring portion 14 are secured a plurality of depending beaters or stirrers 17, 17 which are held together to form a beater unit by an encircling band 18 secured thereto by rivets 19, 19, the beaters being attached at their upper ends to portion 14 by rivets 20 or by brazing or welding them to the sleeve. As the beaters are firmly secured to the lower portion of the mentioned sleeve, they will naturally revolve with the sleeve and its flange and washer.

Means are included for conveniently rotating the sleeve and beaters in the form of a feed screw 21 which may be made by twisting a square or flat strip of metal throughout its length and fastening a stop in the form of a cross piece 22 at the bottom thereof and passing the twisted feed screw through slit 13 in the bottom of sleeve 12. Upon the upper end of the screw is fastened a handle or knob 23 by which to draw this screw upwards and push it downwards while holding knob 23 firmly and preventing it from turning in the hand. In view of the screw pitch of this feed screw, it will force the lower flaring slitted end 14 to rotate in accordance with the twist of the screw and thus rotate the beaters first in one direction and then in the opposite direction, when the screw is pushed down or pulled upwards, etc. This is due to the slit engaging with the sides of the screw and preventing it from rotating as it goes through slit 13, and instead forcing the sleeve 12 to rotate with its appurtenances. The speed of reverse rotation depends entirely upon the speed of movement up and down of the knob 23, and is thus easily controlled, and is but a simple movement.

Of course, I prefer to make the parts of metal or alloy, but the container may well be of glass, and knob 23 may be of wood, plastic or any other suitable material. On the other hand, the whole device may be made large or small or of any convenient size for use in the kitchen.

Manifestly, variations may be resorted to, and parts and features may be modified or used without others within the scope of the appended claims.

Having now fully described my invention, I claim:

1. A manually operated mixer of the character described, including an upwardly open container having a wide screw neck, a cap for the container having a depending flange with screw convolutions fitting the screw neck of said container, the cap having a central opening, a sleeve extending rotatably down through the opening in the cap and having a flange thereon resting movably upon said cap and having a rectangular slit through the bottom thereof, means preventing accidentally pulling the sleeve upwardly out of said cap, a screw member extending down through said rectangular slit in said sleeve, and beater means rotatable by said sleeve within said container.

2. A manually operated mixer according to claim 1, wherein the beater means include a plurality of depending beaters of light construction firmly secured to the lower end of the sleeve and having an encircling band binding the beaters into a beater unit.

3. A manually operated mixer according to claim 2, wherein the lower end of the sleeve flares downwardly and carries the upper ends of the beaters directly, and wherein the means preventing accidental pulling out of the sleeve includes a washer upon the sleeve beneath the cap and above the flaring lower end of said sleeve.

4. A manually operated mixer according to claim 3, wherein the screw member is a twisted elongated member of rectangular cross section which has a stop upon the lower end preventing loss of the screw member and a knob fixed upon the upper end for use in the hand when pulling upwardly and pushing downwardly said screw member to rotate said beaters.

References Cited in the file of this patent

UNITED STATES PATENTS 1,025,798  Fitch _____ May 7, 1912